United States Patent [19]
Walter et al.

[11] Patent Number: 4,462,723
[45] Date of Patent: Jul. 31, 1984

[54] INTERNAL BROACHING TOOL

[75] Inventors: Heinz-Peter Walter, Rüsselsheim; Horst Hahn, Wölfersheim, both of Fed. Rep. of Germany

[73] Assignee: Löhr & Bromkamp GmbH, Offenbach, Fed. Rep. of Germany

[21] Appl. No.: 382,677

[22] Filed: May 27, 1982

[30] Foreign Application Priority Data
Jun. 6, 1981 [DE] Fed. Rep. of Germany ....... 3122574

[51] Int. Cl.³ .............................................. B23P 15/42
[52] U.S. Cl. .......................................... 407/18; 407/13
[58] Field of Search ....................... 407/13, 15, 18, 19

[56] References Cited
U.S. PATENT DOCUMENTS

| 1,201,614 | 10/1916 | Oakley | 407/13 |
| 1,328,085 | 1/1920 | Hollander | 407/13 |
| 1,744,217 | 1/1930 | Forberg | |
| 1,945,535 | 2/1934 | Schiltz | |
| 2,814,094 | 11/1957 | Hanna | 407/13 |
| 4,041,590 | 8/1977 | Schibrowski | |
| 4,357,123 | 11/1982 | Zweekly | 407/110 |

Primary Examiner—Leonidas Vlachos
Attorney, Agent, or Firm—Toren, McGeady and Stanger

[57] ABSTRACT

A broaching tool is formed with a slot within which an adjusting member is received. By adjusting the position of the adjusting member within the slot, forces are developed against the sides of the slot to deform the broaching tool thereby to adjust the operating dimensions of cutting teeth arranged on the broaching tool in the vicinity of the slot.

2 Claims, 10 Drawing Figures

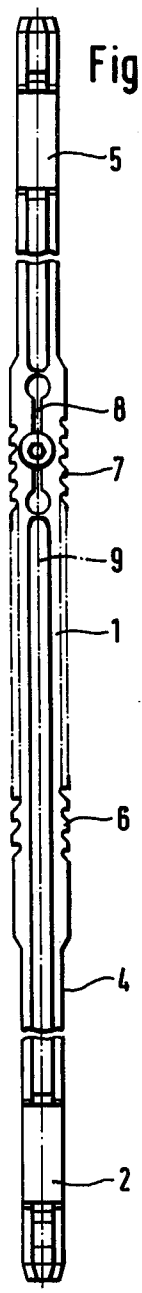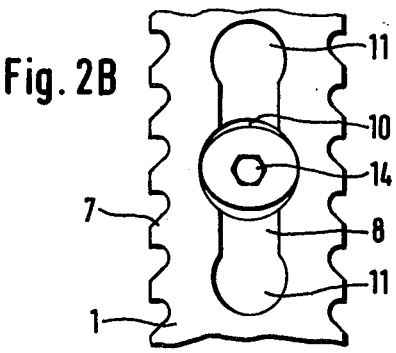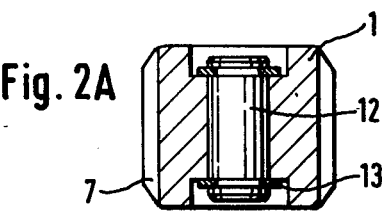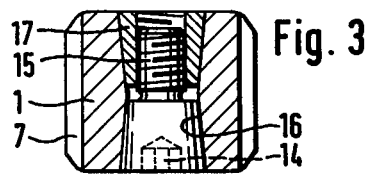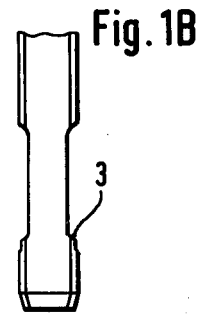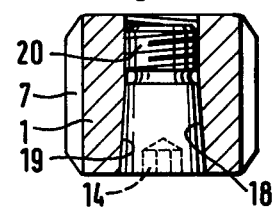

INTERNAL BROACHING TOOL

The present invention relates generally to machine cutting tools and more particularly to an internal broaching tool which is adapted to enable adjustable positioning of cutting teeth thereon.

A tool of the type to which the present invention relates is generally formed with an elongate base member adapted to be held in a broaching machine and having external teeth for effecting a broaching operation. Usually, such a broaching tool will include a part which operates to center a workpiece relative to the tool. The tool may also include a first set of teeth which are formed with progressively increasing dimensions to enable relatively rapid removal of material from the workpiece in order to approximate the required final dimension of the workpiece. A second set of teeth which are formed of the same size are used to accurately finish the workpiece during the broaching operation. Broaching tools known in the prior art are disclosed in U.S. Pat. Nos. 1,744,217 and 1,945,535. In such tools, cutters bearing cutting teeth are removably secured to the base member of the tool by screws. The cutters may be replaced when they are worn, but it becomes necessary for newly replaced cutters to be provided with required dimensions and this involves grinding of the teeth.

In U.S. Pat. No. 4,041,590, there is disclosed a broaching tool in which cutter parts are secured to a base member by bolts, but in which the teeth of the cutters are not interrupted by the necessity of accommodating such bolts. The life of cutters can be prolonged by placing shims beneath the cutters, and cutter elements which have been excessively reduced by grinding may be used at the beginning of the broaching tool to prolong their effective life.

However, in the broaching tools previously proposed in the prior art, the teeth of the tools which accurately produce the required finished dimension of the broached workpiece are not capable of being replaced and although the cutters bearing the teeth of progressively increasing size can be replaced, the life of the broaching tool will be determined by the wear limit of the finishing of calibrating teeth thereof.

Accordingly, the present invention is directed toward providing a broaching tool in which the aforementioned disadvantage may be overcome. More specifically, the invention is directed toward a broaching tool design which is arranged in such a way that the cutting teeth producing the finished dimensions will be provided with a setting and resetting device which will be easily accessible from inside and outside of the broaching machine even if the tool is in the fitted condition.

SUMMARY OF THE INVENTION

Briefly, the present invention may be defined as an internal broaching tool comprising an elongate base portion adapted to be held in a broaching machine, recess means formed in said base portion for receiving therein an adjusting element and cutting tooth means provided on said broaching tool at least in the vicinity of said recess means, said adjusting element cooperating with said recess means to deform said base member thereby to adjust the operating dimensions of said cutting tooth means.

Thus, in accordance with the invention, there is provided an internal broaching tool wherein the part of the broaching tool defining the elongate base member is formed to include a recess or slot formation therein which is adapted to receive an adjusting element. The adjusting element cooperates with the slot or recess to deform the sides of the base member between which the slot is defined. As a result of the deformation of the base member sides, the operative dimension, i.e., the spacing between cutting teeth arranged externally of the broaching tool alongside the slot, may be adjusted by operation of the adjusting element.

The advantage of the arrangement in accordance with the present invention, which preferably is applied to a tooth or teeth of the finishing or calibrating set of teeth of the broaching tool, is that the final dimensions produced in the workpiece by the broaching tool may be accurately set. If the teeth of the broaching tool are worn and must be reground, rapid resetting may be achieved merely by simple operation of the adjusting element. In service, resetting may be made possible without requiring even the removal of the broaching tool from the machine. If slight dimensional changes are required in the workpiece, the same broaching tool may be capable of being continuously used with suitable adjustments and tight tolerances can be maintained.

The recess or slot may extend transversely through the base member relative to the longitudinal axis thereof or it may extend axially of the base member. The adjusting element may be accessible through an aperture in the side of the base member or, in the case of an axially extending recess formation, in the end surface of the base member.

The invention is applicable to broaching tools wherein the teeth are on opposite sides of the base member. It is also applicable to broaching tools which have circumferential teeth extending around the base member, in which case an axially extending formation in the base member would be utilized and the adjusting element therein would be accessible from the end of the broaching tool.

The adjusting element may be a tapered element of any desired form, for example a cone, a ball, an eccentric element, or a cam. Such adjusting elements, by cooperation with appropriately shaped surfaces of the base member, will deform the base member elastically in order to adjust the spacing between the teeth. The base member may return to its original configuration upon release of the adjusting element.

It would be possible to utilize assemblies of adjusting elements which cooperate with one another to engage the base member of the broaching tool in order to effect the desired adjustment. Thus, the base member itself need not have a tapered surface or similar formation in order to achieve cooperation with an adjusting element.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1A is a side view of a broaching tool embodying the invention;

FIG. 1B is a front view of a part of the broaching tool shown in FIG. 1A;

FIG. 2A is a cross-sectional view and FIG. 2B is an elevational view showing in greater detail an adjusting element of the broaching tool of FIG. 1A;

FIG. 3 is a sectional view taken through a broaching tool showing a further embodiment of the adjusting element;

FIG. 4 is a sectional view showing another embodiment of the adjusting element;

DETAILED DESCRIPTION OF THE PREFERRED EMBODIMENTS

Figure 5:
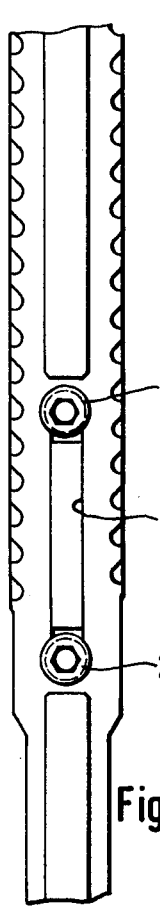
FIG. 5 is an elevational view of a part of a broaching tool which comprises a further embodiment of the adjusting element of the invention.

Referring now to the drawings, and particularly to FIGS. 1A and 1B, there is shown a broaching tool which comprises an elongate base member 1 having at one end thereof a shank 2 defining surfaces 3 which enable the broaching tool to be tensioned by an appropriate holder in a broaching machine.

At the opposite end of the base member, there is provided a portion 5 which also operates to enable the tool to be held in a machine. Adjacent the shank 2 there is provided a surface for centering a workpiece relative to the tool.

The broaching tool is formed with cutting teeth 6 which are arranged so that their size will progressively increase taken in the direction away from the shank 2. The teeth 6 operate to remove material relatively rapidly from a workpiece. The teeth 6 are followed by another set of teeth 7 which are not of increasing size and which operate to finish a broached workpiece to required dimensions.

A recess or slot 8 is provided in the base member of the broaching tool in the region of the finishing teeth 7 with the recess 8 operating to accommodate an adjusting element. The adjusting element and the various forms which may be provided in accordance with preferred embodiments of the invention will be described in greater detail hereinafter with reference to FIGS. 2A, 2B, 3, and 4.

In FIGS. 2A and 2B, there is shown in greater detail the form of the recess 8. As indicated in the drawings, the recess or slot 8 is shaped to comprise a main bore 10 which extends transversely through the base member 1 and a pair of further bores 11 spaced axially on opposite sides of the bore 10. The bores 10 and 11 are joined together to form the overall slot or recess of the invention. The bore 10 receives an adjusting element which, in the embodiment of FIGS. 2A and 2B, is provided in the form of an eccentric member 12 held in place by retaining rings 13 and including a hexagonal socket 14 by means of which the adjusting element 12 may be rotated within the bore 10.

Because the section of the adjusting element 12 which is located within the bore 10 is not circular, rotational adjustment of the element 12 will operate to deform the base member and hence to increase or decrease the distance between the tips of the teeth 7 adjacent the element 10. The bores 11 operate to impart resilience to the base member in this region.

An alternative form of the adjusting element is shown in FIG. 3 where the bore 10 is shown as comprising two opposed frustoconical portions and the adjusting element as comprising a bolt 15 having a frustoconical head 16 and a nut 17 with an external surface which is frustoconical. The bolt 15 has an hexagonal socket 14 in the head thereof whereby it may be rotated. Drawing the nut and bolt toward one another will operate to expand the base member across the cutting teeth 7.

A further embodiment of the invention is shown in FIG. 4 in which the bore in the base member is provided with a screw-threaded portion 20 and a frustoconical portion 19. The adjusting element comprises a bolt with a screw thread engaging the threaded portion 20 in the base member and a frustoconical head 18 having a socket 14. Tightening of the tensioning element will operate to expand the broaching tool across the teeth 7.

Figure 6:
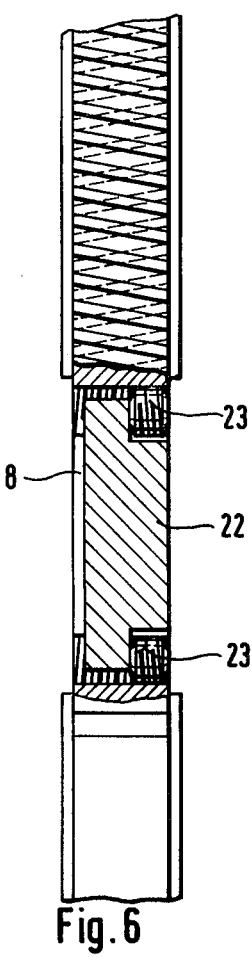
FIG. 6 is a longitudinal section of the broaching tool shown in FIG. 5.
Figure 7:
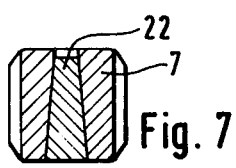
FIG. 7 is a transverse sectional view of the broaching tool of FIG. 5.

In FIGS. 5, 6, and 7, there is shown a further embodiment of the invention wherein the broaching tool is formed with a recess 8 which is in the shape of an elongated wedge. An adjusting element in the form of a wedge 22 is received in the recess 8 with the wedge 22 being adjusted by operation of grub screws 23 which are received in screw-threaded bores 21 at the ends of the recess 8 and which engage end portions of the element 22. Tightening of the grub screws 23 will operate to force the wedge 22 further into the recess 8 thereby causing an increase in the dimension of the broaching tool across the teeth 7.

Figure 8:
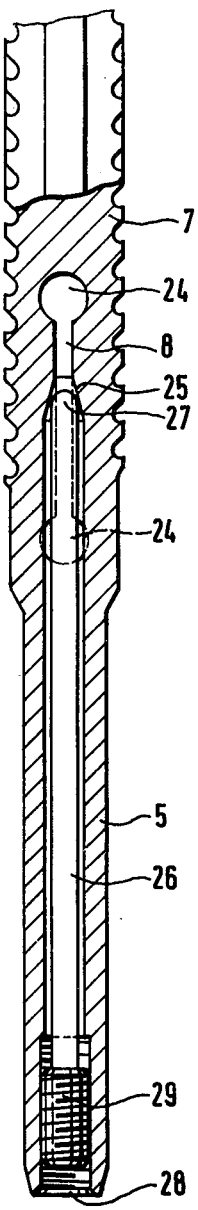
FIG. 8 is a longitudinal sectional view of the broaching tool comprising a further embodiment of the adjusting element of the invention.

Referring now to FIG. 8, there is shown an embodiment of the invention wherein the recess 8 is formed to extend through the base member in a direction parallel to the longitudinal axis 9 thereof. The recess 8 extends between two transverse bores 24 and includes a frustoconical surface 25. The surface 25 is engaged by a spherical surface 27 provided at the end of a rod 26 which extends axially from adjacent the free end of the base member.

Alternatively, a separate ball engaged by a rod 26 could be provided. A grub screw 29 received in a screw-threaded end portion 28 of the base member engages the rod 26 so that when the screw 29 is tightened, the teeth of the tool will be expanded in the region between the bores 24.

An embodiment similar to that shown in FIG. 8 may be utilized wherein the broaching tool is formed with circular teeth for broaching a circular bore in a workpiece and wherein a radial expansion of the teeth 7 may also be effected.

While specific embodiments of the invention have been shown and described in detail to illustrate the application of the inventive principles, it will be understood that the invention may be embodied otherwise without departing from such principles.

What is claimed is:

1. An internal broaching tool comprising:
    an elongate base member adapted to be held in a broaching machine;
    a shank portion at one end thereof having surfaces enabling said broaching tool to be held in the holder of a broaching machine and for centering a workpiece relative to said tool;
    first cutting teeth arranged with the sides thereof progressively increasing taken in a direction away from said shank;

second cutting teeth having a generally uniform size for finishing a broached workpiece to required dimensions, said second cutting teeth being provided on a part of said broaching tool which is capable of elastic deformation to enable adjustment of the operating dimensions of said second cutting teeth;

recess means formed in said broaching tool at least in the parts thereof adjacent said second cutting teeth; and an adjusting element engaging with said recess means and cooperating therewith to enable adjustment of said operating dimensions of said second cutting teeth;

said recess means comprising a first part provided with threads and a second part having a conical configuration coaxially adjoining said first part, with said adjusting element being formed with corresponding conical tensioning faces in contacting engagement with said second part and with a threaded portion engaging said first part for effecting adjustable engagement between said corresponding conical tensioning faces and said second part.

2. An internal broaching tool comprising:

an elongate base member adapted to be held in a broaching machine;

a shank portion at one end thereof having surfaces enabling said broaching tool to be held in the holder of a broaching machine and for centering a workpiece relative to said tool;

first cutting teeth arranged with the sides thereof progressively increasing taken in the direction away from said shank;

second cutting teeth having a generally uniform size for finishing a broached workpiece to required dimensions, said second teeth being provided on a part of said broaching tool which is capable of elastic deformation to enable adjustment of said operating dimensions of said second cutting teeth;

recess means formed in said broaching tool at least in the parts thereof adjacent said second cutting teeth; and an adjusting element engaging within said recess means and cooperating therewith to enable adjustment of said operating dimensions of said second cutting teeth;

said recess means being formed of two conical tensioning faces extending in opposite directions relative to one another with said adjusting element having a corresponding conical tensioning face in engagement with one of said conical faces of said recess means and with a trunnion being provided between said adjusting element and said recess means, said trunnion having screw threads therein engaging with threads in said adjusting element and a conical outer face engaging with one of said two conical tensioning faces of said recess means.

* * * * *